(12) United States Patent
Seo

(10) Patent No.: US 11,235,474 B2
(45) Date of Patent: Feb. 1, 2022

(54) WORKPIECE GRIPPING DEVICE

(71) Applicant: SMC CORPORATION, Chiyoda-ku (JP)

(72) Inventor: Takeshi Seo, Nagareyama (JP)

(73) Assignee: SMC CORPORATION, Chiyoda-ku (JP)

( * ) Notice: Subject to any disclaimer, the term of this patent is extended or adjusted under 35 U.S.C. 154(b) by 138 days.

(21) Appl. No.: 16/614,117

(22) PCT Filed: Apr. 11, 2018

(86) PCT No.: PCT/JP2018/015181
§ 371 (c)(1),
(2) Date: Nov. 15, 2019

(87) PCT Pub. No.: WO2018/211868
PCT Pub. Date: Nov. 22, 2018

(65) Prior Publication Data
US 2020/0147811 A1    May 14, 2020

(30) Foreign Application Priority Data
May 18, 2017 (JP) .............................. JP2017-099082

(51) Int. Cl.
*B25J 15/00* (2006.01)
*B66C 1/48* (2006.01)

(52) U.S. Cl.
CPC .............. *B25J 15/009* (2013.01); *B66C 1/48* (2013.01)

(58) Field of Classification Search
CPC ............ B25J 15/009; B25J 15/00; B66C 1/48
See application file for complete search history.

(56) References Cited

U.S. PATENT DOCUMENTS

| 4,461,193 | A | * | 7/1984 | Gruber | ...................... | B25B 7/18 |
| | | | | | | 81/420 |
| 5,142,776 | A | * | 9/1992 | Neely | ....................... | B25B 5/06 |
| | | | | | | 24/509 |
| 5,901,993 | A | * | 5/1999 | Lowery | ................. | A47J 43/283 |
| | | | | | | 294/7 |
| 5,934,721 | A | * | 8/1999 | Walde | ................. | A47J 37/0786 |
| | | | | | | 294/3 |

(Continued)

FOREIGN PATENT DOCUMENTS

| JP | 5-269689 A | 10/1993 |
| JP | 6-239580 A | 8/1994 |
| JP | 7-42330 U | 8/1995 |

(Continued)

OTHER PUBLICATIONS

International Search Report and Written Opinion dated Jul. 11, 2018 in PCT/JP2018/015181 filed on Apr. 11, 2018.

(Continued)

*Primary Examiner* — Stephen A Vu
(74) *Attorney, Agent, or Firm* — Oblon, McClelland, Maier & Neustadt, L.L.P.

(57) ABSTRACT

A workpiece gripping device includes a gripping body part that includes a slit into which a plate-shaped part of a workpiece can be inserted; and a positioning mechanism that includes an engagement part that is structured to be engaged with the plate-shaped part of the workpiece in the slit of the gripping body part, in order to position the workpiece.

12 Claims, 9 Drawing Sheets

(56) References Cited

U.S. PATENT DOCUMENTS 9,744,673 B1 * 8/2017 Gordon ............... B25J 15/0028

FOREIGN PATENT DOCUMENTS

| | | |
|---|---|---|
| JP | 7-252085 A | 10/1995 |
| JP | 10-100996 A | 4/1998 |
| JP | 2006-282291 A | 10/2006 |
| JP | 3179866 U | 11/2012 |
| JP | 2013-857 A | 1/2013 |
| JP | 2013-188805 A | 9/2013 |
| KR | 2003-0079123 A | 10/2003 |
| KR | 10-2012-0110907 A | 10/2012 |
| KR | 10-2013-0026117 A | 3/2013 |

OTHER PUBLICATIONS

Notice of Reasons for Refusal dated Aug. 29, 2019 in Japanese Patent Application No. 2017-099082 (with English language translation).
Korean Office Action dated Apr. 27, 2021 in Korean Patent Application No. 10-2019-7034866 (with English translation), 10 pages.

* cited by examiner

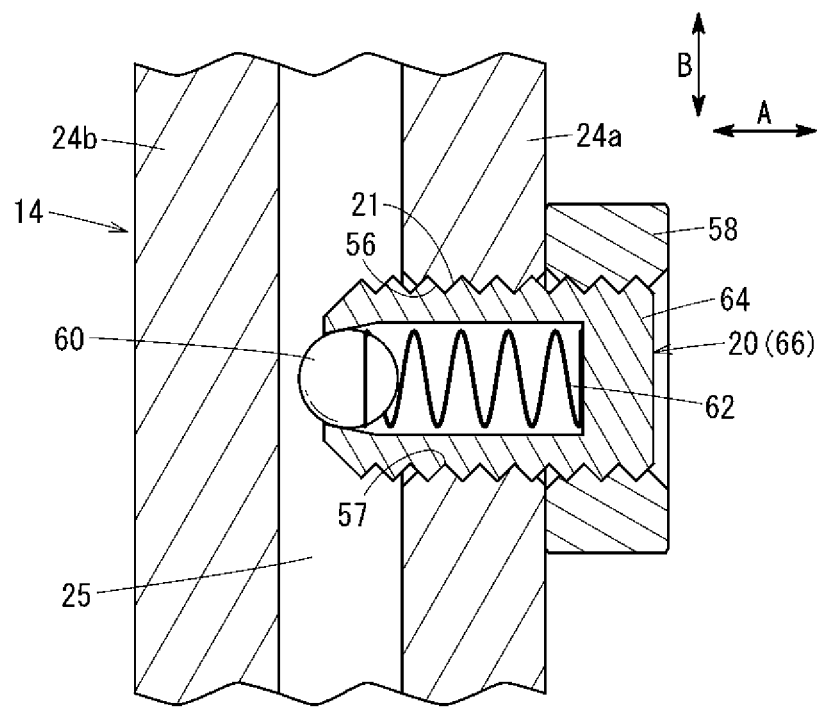

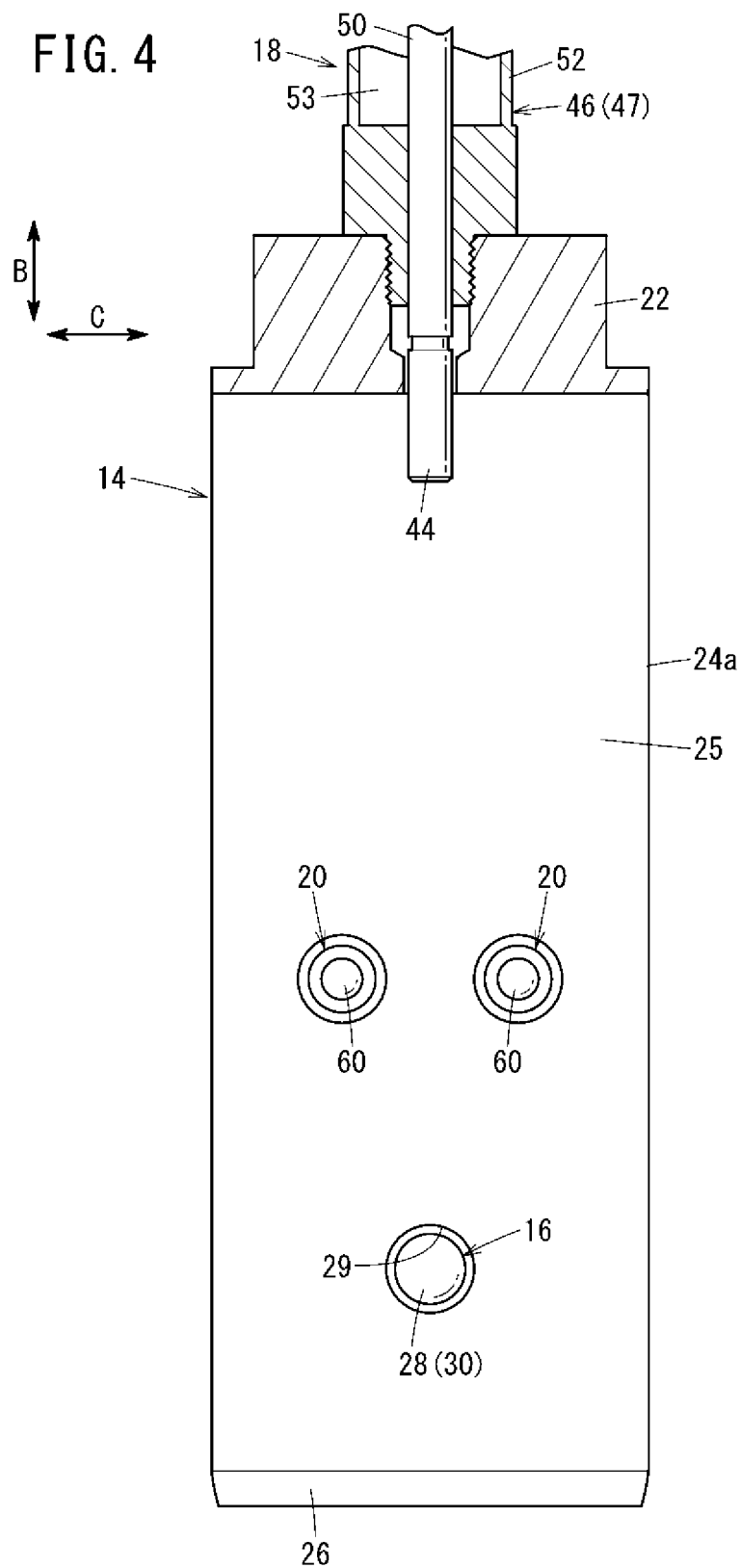

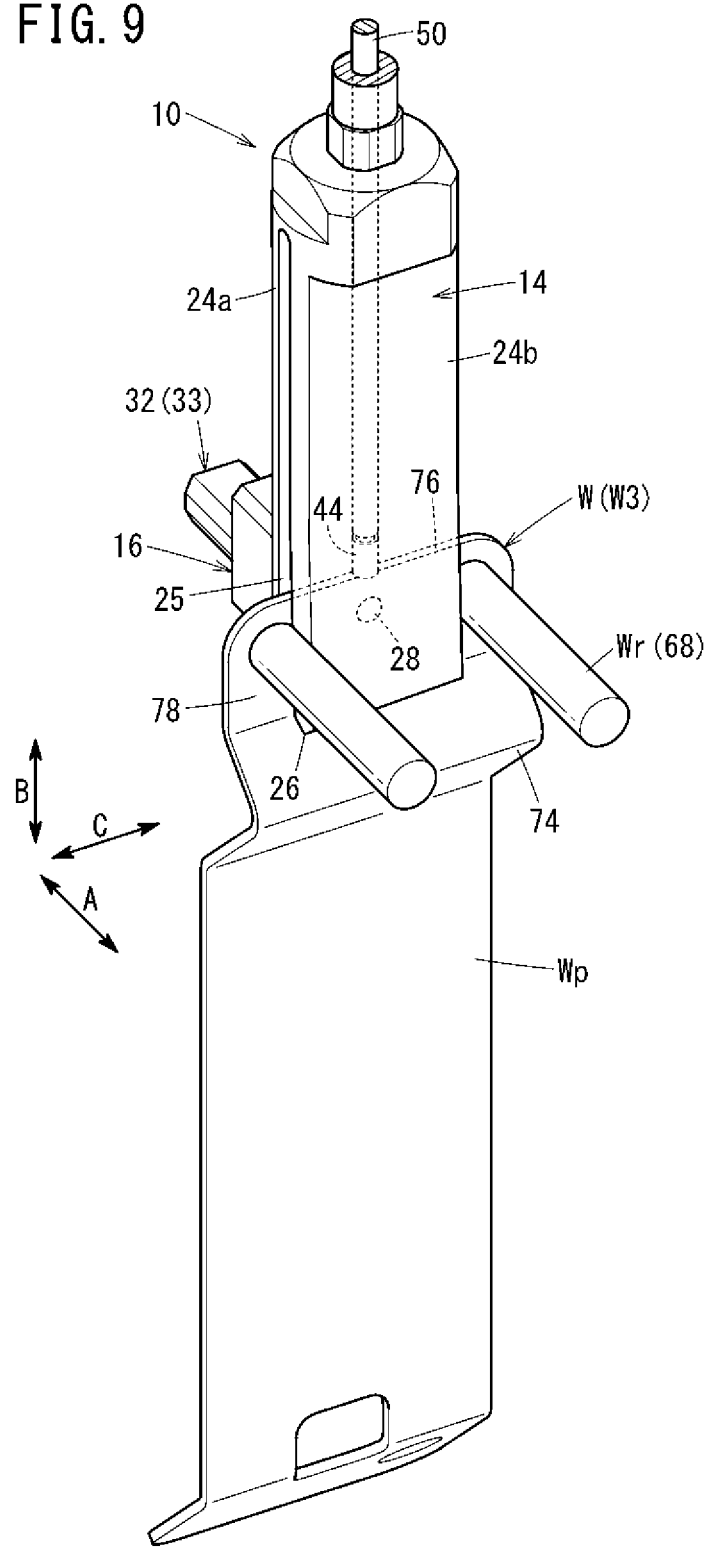

WORKPIECE GRIPPING DEVICE

TECHNICAL FIELD

The present invention relates to a workpiece gripping device that is attached to a robot and used.

BACKGROUND ART

Conventionally, in order to improve production efficiency, at least a part of each process in a production line has been automated and a robot carries out certain work. For example, in order to take a workpiece out of a predetermined place and transport the workpiece to another place, a robot has a workpiece gripping device (what is called a robot hand) (for example, see Japanese Laid-Open Patent Publication No. 2013-000857).

SUMMARY OF INVENTION

Conventional workpiece gripping devices have been unable to grip workpieces with various shapes including a plate-shaped member, such as a sheet metal component. For example, the workpiece gripping device according to Japanese Laid-Open Patent Publication No. 2013-000857 can grip workpieces with various sizes, but cannot grip workpieces with various shapes.

The present invention has been made in consideration of the above problem, and an object is to provide a workpiece gripping device that can grip workpieces with various shapes including a plate-shaped part in at least a part thereof.

To achieve the above object, a workpiece gripping device attached to a robot and used for gripping a workpiece, the workpiece including a plate-shaped part in at least a part thereof is provided. The device includes: a gripping body part including a slit into which the plate-shaped part of the workpiece is configured to be inserted; and a positioning mechanism including an engagement part configured to be engaged with the plate-shaped part of the workpiece in the slit of the gripping body part, in order to position the workpiece.

In the workpiece gripping device structured as above, the gripping body part is moved so that the plate-shaped part of the workpiece is inserted into the slit of the gripping body part and the positioning mechanism positions the workpiece inserted into the slit. Thus, the workpieces with various shapes including the plate-shaped part can be gripped appropriately. Therefore, the robot to which the workpiece gripping device is attached can transport the workpiece automatically.

In the workpiece gripping device, it is preferable that: the gripping body part may include a base part and two arm parts that extend from the base part and face each other, and the gripping body part may have an elongate-bar shape as a whole; and the slit is formed between the two arm parts.

Thus, the gripping body part can be reduced in size.

It is preferable that a tip end of at least one of the two arm parts may have a wedge shape.

When a plurality of workpieces are placed while overlapping each other, the above structure can insert the arm part with the wedge-shaped tip end into a space between the overlapping workpieces, so that one of the overlapping workpieces can be gripped easily.

It is preferable that the positioning mechanism may include a positioning pin configured to move in a thickness direction of the slit, and a positioning actuator configured to drive the positioning pin.

By this structure, the positioning pin is engaged with a particular shape part (for example, hole, notch, or bending part) provided to the workpiece W, so that the workpiece can be positioned more appropriately.

It is preferable that: the positioning actuator may include an output part configured to operate in the thickness direction of the slit; and the positioning pin may be inserted into a pin insertion hole provided in the gripping body part, and be fixed to a tip end part of the output part.

Thus, the positioning mechanism with the appropriate positioning capability can be achieved by the simple structure.

It is preferable that the workpiece gripping device may further include a stabilizer configured to suppress a movement of the workpiece inserted into the slit, and the stabilizer may include a contact part configured to contact an edge part of the workpiece, and an actuator configured to move the contact part.

This structure can prevent the workpiece gripped by the workpiece gripping device from wobbling.

It is preferable that the contact part may be arranged in the slit.

Thus, since the contact part is brought into contact with the workpiece in the slit, the wobble of the workpiece can be suppressed with a small structure.

It is preferable that: the positioning mechanism may include a positioning pin configured to move in a thickness direction of the slit; and the contact part may be arranged on an inner side of the slit relative to the positioning pin.

Since this structure holds the workpiece between the positioning pin and the contact part, the workpiece can be gripped more stably.

It is preferable that the workpiece gripping device may further include a pressing member projecting into the slit, and the pressing member may be configured to press the workpiece inserted into the slit, in a thickness direction of the workpiece.

This structure improves the stability of gripping the workpiece.

It is preferable that the pressing member may be arranged on an inner side of the slit relative to the engagement part of the positioning mechanism.

This structure further improves the stability of gripping the workpiece.

It is preferable that the pressing member may be a ball plunger that includes a ball and a spring configured to elastically energize the ball.

This structure reduces the insertion resistance when the workpiece is inserted into the slit of the gripping body part; thus, the workpiece can be gripped smoothly.

It is preferable that the pressing member may be inserted into a hole part provided in the gripping body part.

By this structure, the pressing member can be easily provided to the gripping body part.

It is preferable that: the workpiece gripping device may further include a stabilizer configured to suppress a movement of the workpiece inserted into the slit; the stabilizer may include a contact part configured to contact an edge part of the workpiece, and an actuator configured to move the contact part; and the pressing member may include at least two pressing members and the two pressing members may be arranged to be separated from each other so that the contact part is configured to be inserted therebetween.

By this structure, the contact part can be moved to a tip end side of the slit over the pressing member without interference between the contact part and the pressing member.

The workpiece gripping device according to the present invention can grip the workpieces with various shapes including a plate-shaped part in at least a part thereof.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF DRAWINGS

FIG. 3 is a magnified cross-sectional view of a pressing member and its periphery;

FIG. 4 is a cross-sectional view taken along line Iv-Iv in FIG. 1;

FIG. 9 is a perspective view for describing a case in which the workpiece gripping device grips the workpiece illustrated in FIG. 5C.

DESCRIPTION OF EMBODIMENTS

A preferred embodiment of a workpiece gripping device according to the present invention will be described below with reference to the attached drawings.

Figure 1:
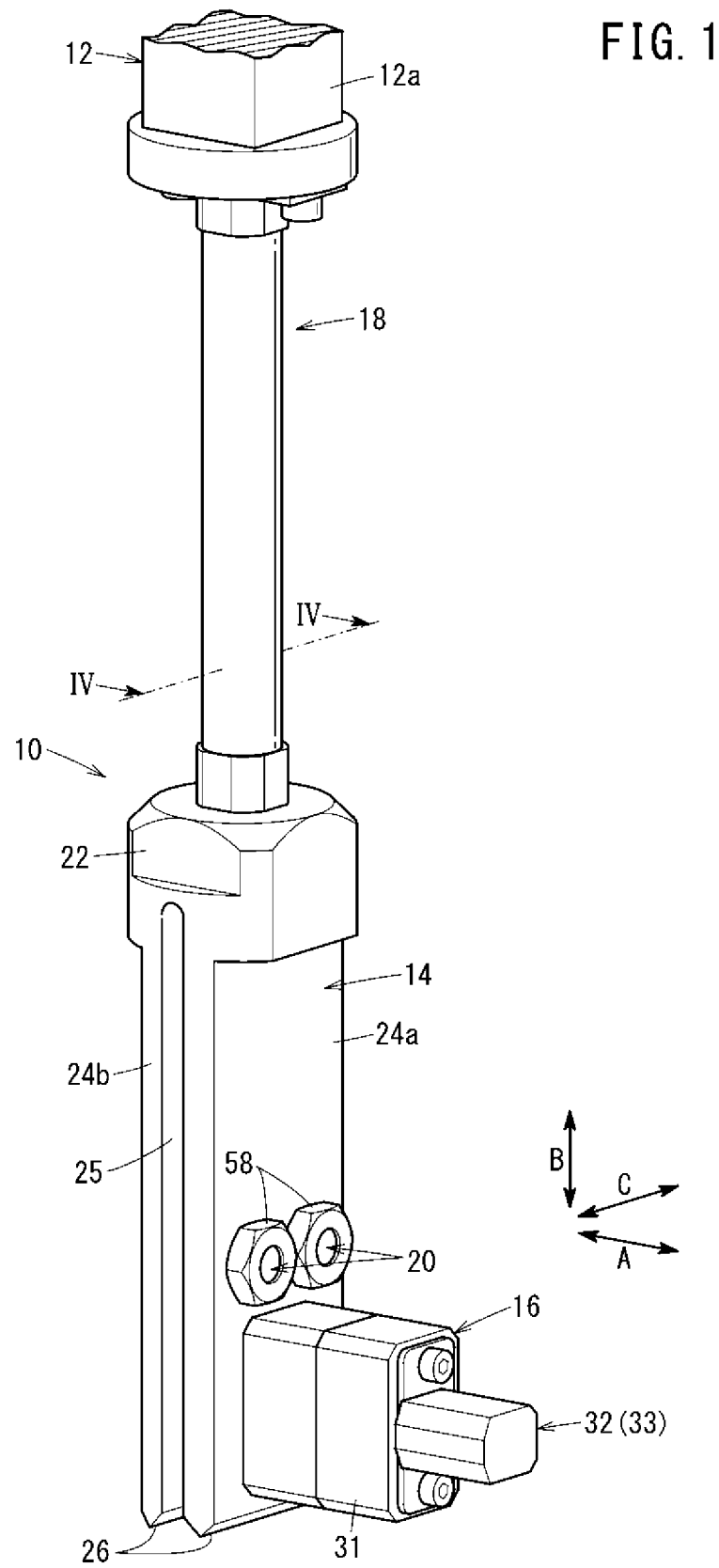
FIG. 1 is a perspective view of a workpiece gripping device according to an embodiment of the present invention.

A workpiece gripping device 10 according to the present embodiment illustrated in FIG. 1 is what is called a robot hand that is attached to a robot 12 and used. By the use of the robot 12 with the workpiece gripping device 10 attached, a workpiece W (see FIG. 5A, etc.) is taken out of a predetermined place (such as a pallet where a plurality of workpieces W are housed or placed), and transported to another place (for example, another component to which the workpiece W is assembled).

The robot 12 to which the workpiece gripping device 10 is attached is, for example, an articulated arm type robot including an arm with a plurality of joints or a cartesian coordinate robot including two or three orthogonal slide axes (what is called gantry robot). In FIG. 1, the workpiece gripping device 10 is attached to a tip end part 12a of the robot 12.

The workpiece gripping device 10 is structured so as to grip the workpiece W including a flat plate-shaped part Wp (see FIG. 5A, etc.) in at least a part thereof. The workpiece gripping device 10 includes a gripping body part 14 including a slit 25 into which the plate-shaped part Wp of the workpiece W can be inserted, a positioning mechanism 16 that positions the workpiece W, a stabilizer 18 for suppressing a movement of the workpiece W that is inserted into the slit 25, and a pressing member 20 that projects into the slit 25.

The gripping body part 14 includes a base part 22 and two arm parts 24a, 24b that extend from the base part 22 and face each other. The gripping body part 14 has an elongate-bar shape as a whole. The slit 25 is formed between the two arm parts 24a, 24b. The slit 25 is a space that opens to a tip end direction of the gripping body part 14 and also opens to both sides in a width direction of the arm parts 24a, 24b (arrow-C direction). Each of the arm parts 24a, 24b has a plate shape and is elastically de-formable in a thickness direction of the slit 25 (arrow-A direction).

Figure 2:
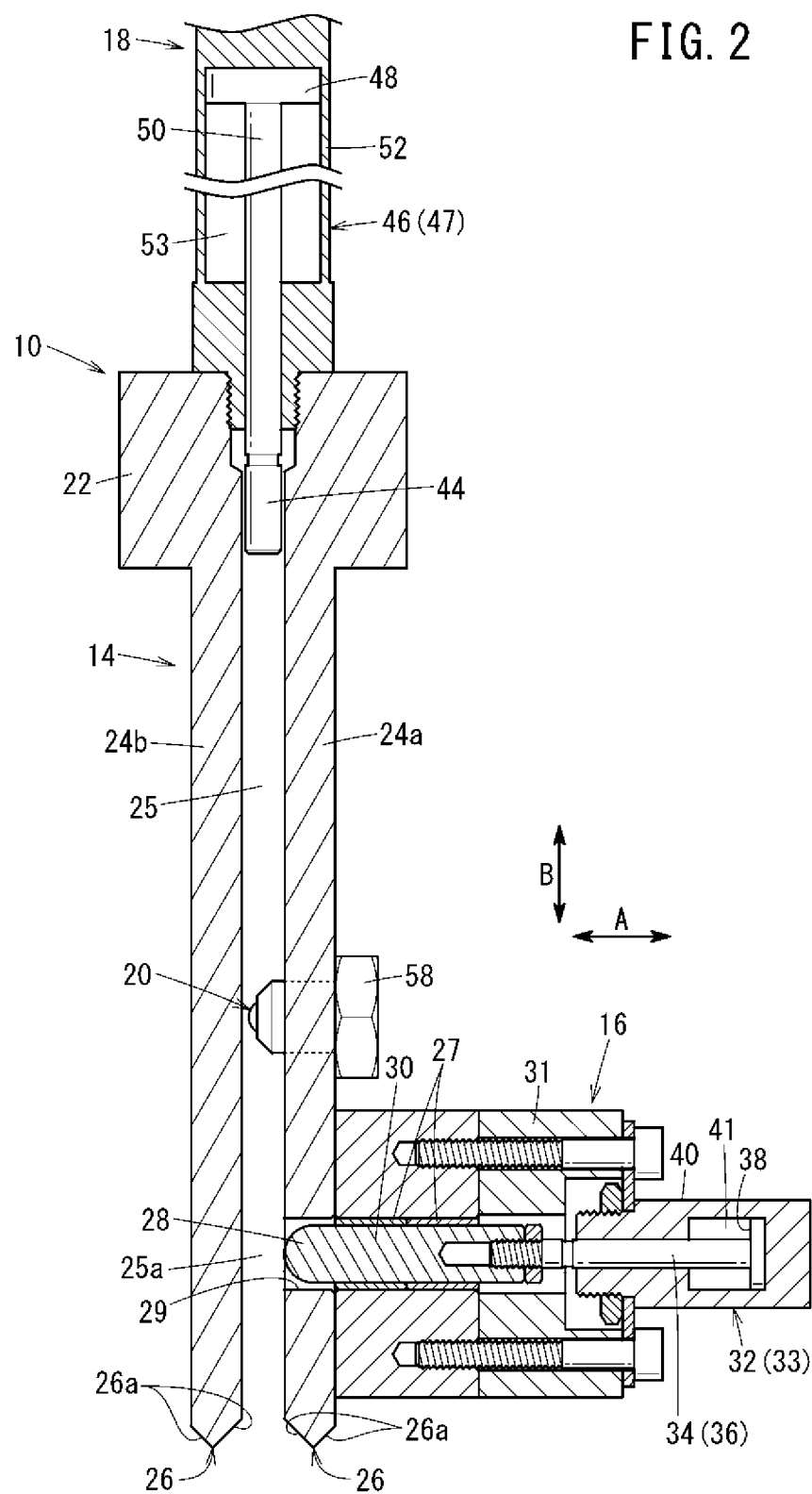
FIG. 2 is a partially-omitted cross-sectional view of the workpiece gripping device.

A tip end of each of the arm parts 24a, 24b has a wedge shape and is hereinafter referred to as a wedge-shaped part 26. As illustrated in FIG. 2, in the present embodiment, the wedge-shaped part 26 has a shape like a letter of V that includes two inclined surfaces 26a with respect to an extending direction of the arm parts 24a, 24b (arrow-B direction). Note that the wedge-shaped part 26 may have a shape that includes only one inclined surface. The wedge-shaped part 26 may be provided to only one of the two arm parts 24a, 24b.

In order to position the workpiece W, the positioning mechanism 16 includes an engagement part 28 that is structured to be engaged with the plate-shaped part Wp of the workpiece W in the slit 25 of the gripping body part 14. Specifically, the positioning mechanism 16 includes a positioning pin 30 that is movable in the thickness direction of the slit 25, and a positioning actuator 32 that drives the positioning pin 30. A tip end part of the positioning pin 30 forms the engagement part 28.

The positioning pin 30 is inserted into a pin insertion hole 29 that is provided in the one arm part 24a of the gripping body part 14. The positioning pin 30 has an elongate and straight bar shape. The positioning pin 30 is supported so that the positioning pin 30 is displaceable in the thickness direction of the slit 25. Specifically, a support member 31 is fixed to the arm part 24a, and the positioning pin 30 is supported by a bushing 27 arranged in the support member 31 so that the positioning pin 30 is displaceable in an axial direction of the positioning pin 30.

The positioning actuator 32 is fixed to the gripping body part 14 through the support member 31. The positioning actuator 32 includes an output part 34 that operates in the thickness direction of the slit 25. The positioning pin 30 is fixed to a tip end part of the output part 34. In the present embodiment, the positioning actuator 32 is a cylinder unit 33 including a piston rod 36. The output part 34 is the piston rod 36 of the cylinder unit 33. A piston 38 is provided to a base end part of the piston rod 36. When a pressure fluid (for example, compressed air) is supplied to or discharged from a pressure chamber 41 formed in a cylinder body 40 of the cylinder unit 33, the piston rod 36 operates in an axial direction of the piston rod 36 (arrow-A direction).

Along with the operation of the piston rod 36, the positioning pin 30 operates in the same direction. Driving of the positioning actuator 32 can cause the positioning pin 30 to move between a position where the engagement part 28 is advanced into the slit 25 (advanced position) and a position where the engagement part 28 is retreated from the slit 25 (retreated position). FIG. 2 illustrates a state in which the engagement part 28 is retreated from the slit 25. Note that the positioning actuator 32 is not limited to the cylinder unit 33 and may be, for example, a linear motor.

The stabilizer 18 includes a contact part 44 that can contact an edge part 76 (see FIG. 5A, etc.) of the workpiece W, and an actuator 46 that causes the contact part 44 to move in the extending direction of the arm parts 24a, 24b (arrow-B direction). In the present embodiment, the actuator 46 is a cylinder unit 47 that includes a piston rod 50 provided with a piston 48 at a base end part, and a cylinder body 52 where the piston 48 is arranged slidably in an axial direction. A tip end part of the piston rod 50 forms the contact part 44. Note that other member that is fixed to the tip end part of the piston rod 50 may form the contact part 44.

The actuator 46 is fixed to the base part 22 of the gripping body part 14. When a pressure fluid (for example, compressed air) is supplied to or discharged from a pressure chamber 53 formed in the cylinder body 52 of the cylinder unit 47, the piston rod 50 operates in an axial direction of the piston rod 50. The piston rod 50 is arranged in parallel with the extending direction of the arm parts 24a, 24b of the gripping body part 14.

The contact part 44 is arranged in the slit 25. The contact part 44 is arranged on an inner side of the slit 25 relative to the positioning pin 30. Driving of the actuator 46 causes the contact part 44 to be advanced or retreated in the slit 25 in a longitudinal direction of the slit 25 (arrow-B direction). The actuator 46 is structured and arranged so that, when the actuator 46 has extended the longest (when the piston rod 36 has advanced the most), the contact part 44 reaches the tip end side of the slit 25 over the pressing member 20.

In the present embodiment, the piston rod 36 is arranged so that an extension line of an axis of the piston rod 50 passes through a movement path 25a of the engagement part 28 in the slit 25. Note that the piston rod 36 may be arranged so that an extension line of an axis of the piston rod 36 passes through a position that is deviated from the movement path 25a of the engagement part 28. Note that the actuator 46 is not limited to the cylinder unit 47 and may be, for example, a linear motor.

The pressing member 20 presses the workpiece W that is inserted into the slit 25, in a thickness direction of the workpiece W. The pressing member 20 is fixed to the gripping body part 14. As illustrated FIG. 1, in the present embodiment, the two pressing members 20 are arranged to be separated from each other.

As illustrated FIG. 3, the pressing member 20 is inserted into a hole part 56 that is provided in the gripping body part 14 (one arm part 24a). The hole part 56 is a screw hole that penetrates the arm part 24a in a thickness direction, and a female screw 57 is formed on an inner peripheral part of the hole part 56. A male screw 21 that is formed on an outer peripheral part of the pressing member 20 is screwed with the female screw 57 of the hole part 56. A fixing nut 58 is screwed with the pressing member 20 on an outer surface side of the gripping body part 14. In the present embodiment, the pressing member 20 is arranged on the inner side of the slit 25 relative to the engagement part 28 of the positioning mechanism 16.

The pressing member 20 is a ball plunger 66 that includes a ball 60, a spring 62 that elastically energizes the ball 60, and a housing 64 that houses the ball 60 and the spring 62. An axis of the ball plunger 66 is parallel to the thickness direction of the slit 25 (arrow-A direction). In an initial state, a part of the ball 60 projects from a tip end opening of the housing 64 and is exposed to the slit 25. When a predetermined force or more acts on the ball 60 to the inside of the housing 64, the ball 60 is moved to the inside of the housing 64 against an elastic force of the spring 62.

As illustrated FIG. 4, the two pressing members 20 are arranged to be separated from each other so that the contact part 44 can be inserted therebetween. Specifically, the two pressing members 20 are arranged to be separated from each other in a direction (arrow-C direction) that is orthogonal to the thickness direction of the slit 25 and an extending direction of the gripping body part 14 (arrow-B direction). When the piston rod 36 advances, the contact part 44 passes through a space between the two pressing members 20 to move to the tip end side of the slit 25 over the pressing member 20.

Next, an operation of the workpiece gripping device 10 according to the present embodiment structured as above will be described.

Figure 5A:
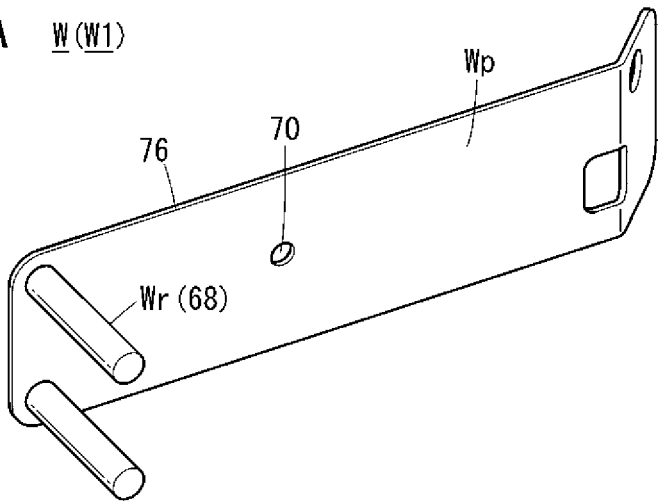
FIG. 5A is a perspective view of a workpiece.
Figure 5B:
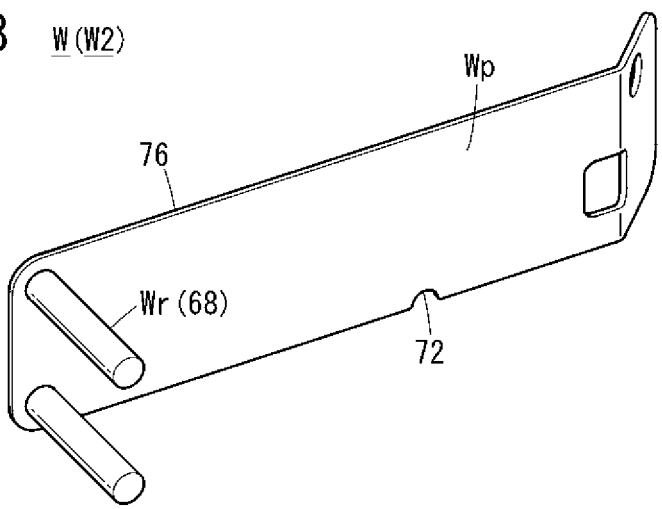
FIG. 5B is a perspective view of a workpiece with another shape.
Figure 5C:
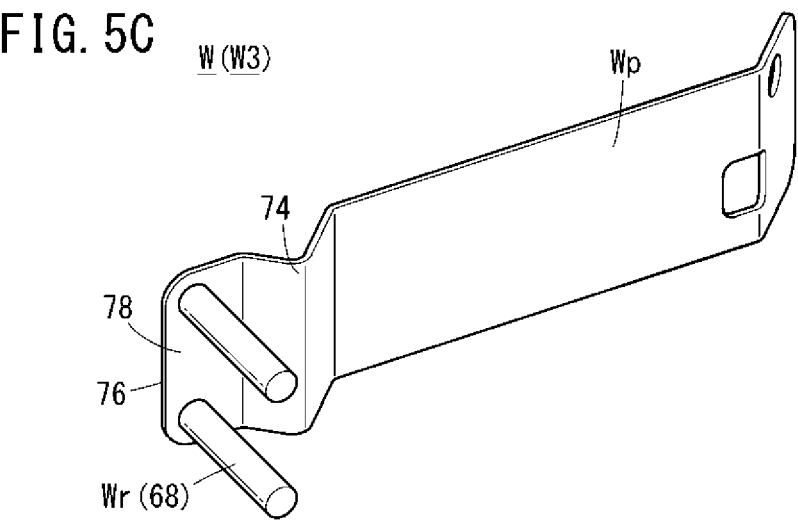
FIG. 5C is a perspective view of a workpiece with a still another shape.

Description will hereinafter be made of examples in which the workpieces W with different shapes are gripped by the workpiece gripping device 10. Examples are illustrated in FIG. 5A to FIG. 5C (each of the workpieces W may be referred to as "workpiece W1", "workpiece W2", or "workpiece W3"). The workpieces W1, W2, and W3 are plate-shaped members that are formed by sheet metal processing, for example. As illustrated in the drawings, the workpieces W1, W2, and W3 include at least a plate-shaped part Wp with a flat shape. However, the workpieces W1, W2, and W3 may also include a part Wr other than the plate-shaped part Wp (for example, bolt 68). The part Wr is not limited to the bolt 68 and may be a block-shaped part. The thickness of the plate-shaped part Wp is 0.8 to 2.2 mm, for example.

The workpiece W1 illustrated in FIG. 5A includes a through hole 70 that penetrates the plate-shaped part Wp in a thickness direction. The workpiece W2 illustrated in FIG. 5B includes a notch 72 on the edge part 76 of the plate-shaped part Wp. The workpiece W3 illustrated in FIG. 5C includes a bending part 74 with a V shape in the plate-shaped part Wp.

Figure 6:
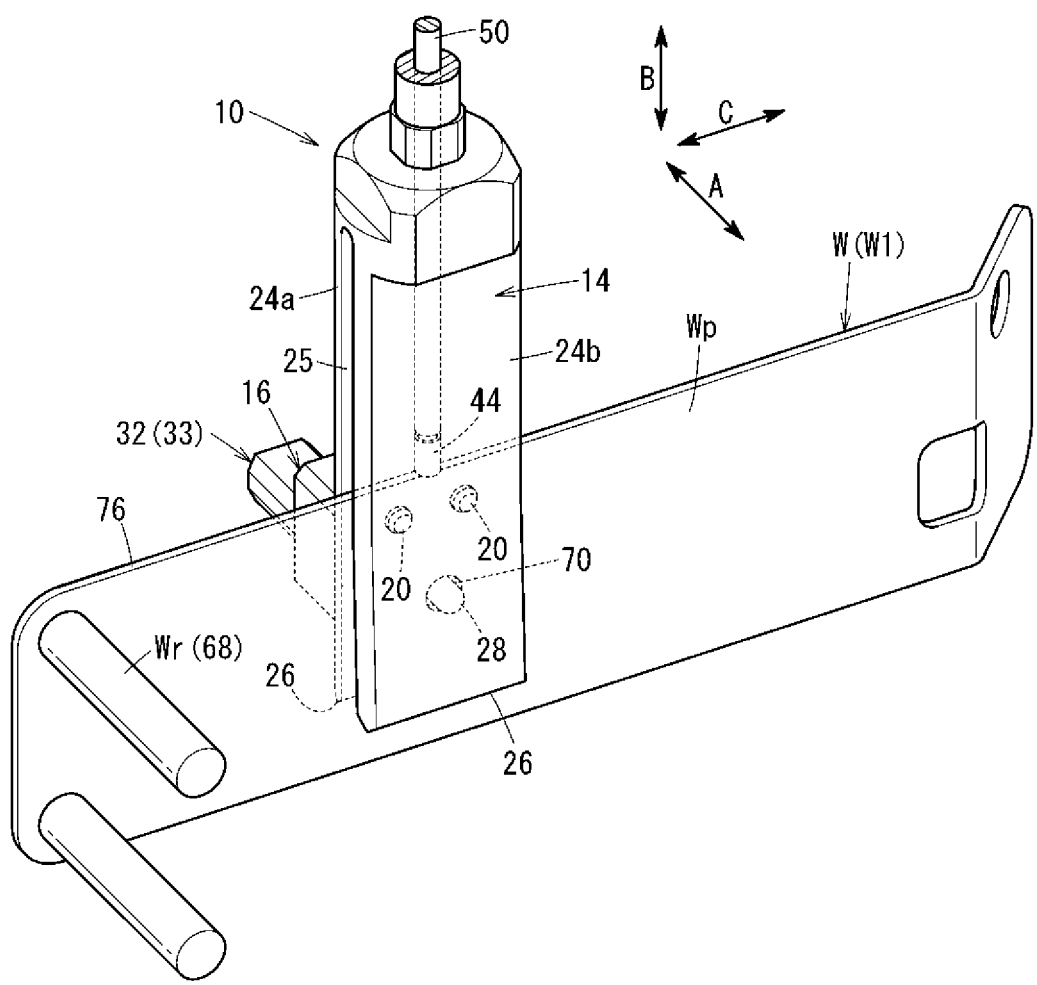
FIG. 6 is a perspective view for describing a case in which the workpiece gripping device grips the workpiece illustrated in FIG. 5A.
Figure 7:
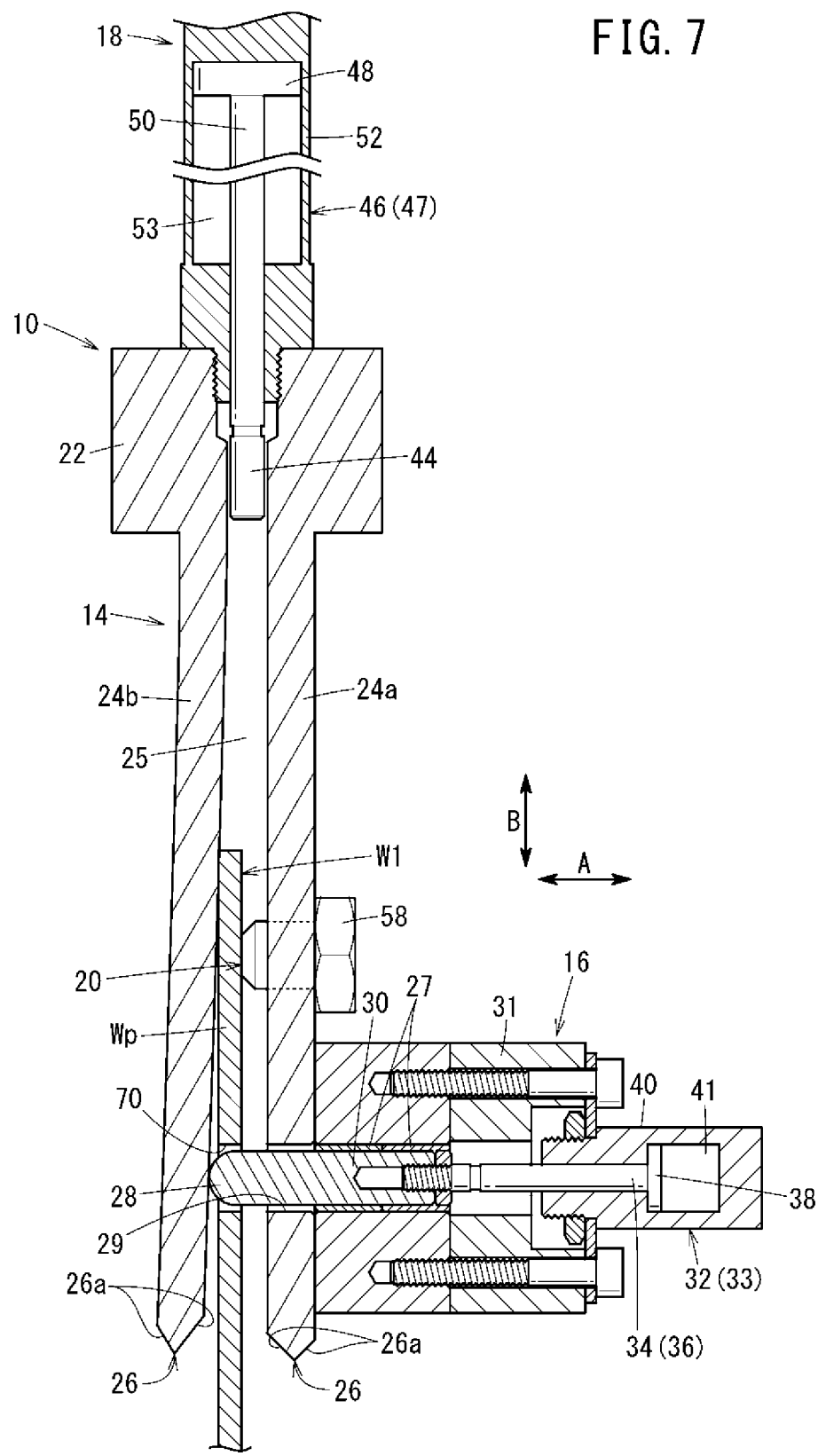
FIG. 7 is a cross-sectional view for describing a case in which the workpiece gripping device grips the workpiece illustrated in FIG. 5A.

When gripping the workpiece W1, as illustrated in FIG. 6 and FIG. 7, the workpiece gripping device 10 can grip the workpiece W1 by using the through hole 70 of the workpiece W1. In this case, specifically, the robot 12 (see FIG. 1) first moves the workpiece gripping device 10 so that the plate-shaped part WP of the workpiece W1 is inserted into the slit 25 of the gripping body part 14. By this movement, the plate-shaped part Wp of the workpiece W1 is clipped or held between the pressing member 20 and the arm part 24b. As illustrated FIG. 7, when the workpiece W1 is clipped, the arm parts 24a, 24b may be elastically deformed to be bent a little toward the outside depending on the thickness of the plate-shaped part Wp.

Next, the positioning actuator 32 is driven to move the positioning pin 30 from the retreated position to the advanced position. Along with the movement of the positioning pin 30, the engagement part 28 that is provided to the tip end part of the positioning pin 30 is moved into the slit 25, and the positioning pin 30 is inserted into the through hole 70 that is provided in the workpiece W1. Therefore, the positioning pin 30 is engaged with the workpiece W1.

Next, the contact part 44 of the stabilizer 18 is moved to be brought into contact with the edge part 76 of the workpiece W1. Specifically, the piston rod 50 of the actuator 46 is advanced, so that the contact part 44 that is provided to the tip end part of the piston rod 50 is pressed to the edge part 76 of the workpiece W1 in a direction (arrow-B direction) that is perpendicular to a thickness direction of the workpiece W1. As a result, a part of the workpiece W1 that is between the edge part 76 and the through hole 70 is held by the contact part 44 and the engagement part 28.

Thus, after the workpiece gripping device 10 grips the workpiece W1, the robot 12 (see FIG. 1) to which the workpiece gripping device 10 is attached transports the workpiece W1 to a predetermined place. At a transport destination, the positioning pin 30 is retreated to release the engagement with the workpiece W1. Then, the workpiece W1 is delivered to the transport destination. When the workpiece W1 is gripped by a counterpart component, a tool (a jig), or the like at the transport destination, the workpiece gripping device 10 is moved to a direction of retreating from the workpiece W1 in a state where the positioning pin 30 is retreated. Then, the workpiece W1 is released from the slit 25. That is to say, the gripping of the workpiece W1 is released. Note that when the workpiece W1 is gripped by the counterpart component, the tool, or the like at the transport destination, the positioning pin 30 may be retreated from workpiece W1 after the piston rod 50 is retreated from the workpiece W1.

Note that when the workpiece W1 is not gripped by the counterpart component, the tool, or the like at the transport destination, the workpiece W1 may be pressed by the piston rod 50 (contact part 44) so as to be released from the slit 25.

Figure 8:
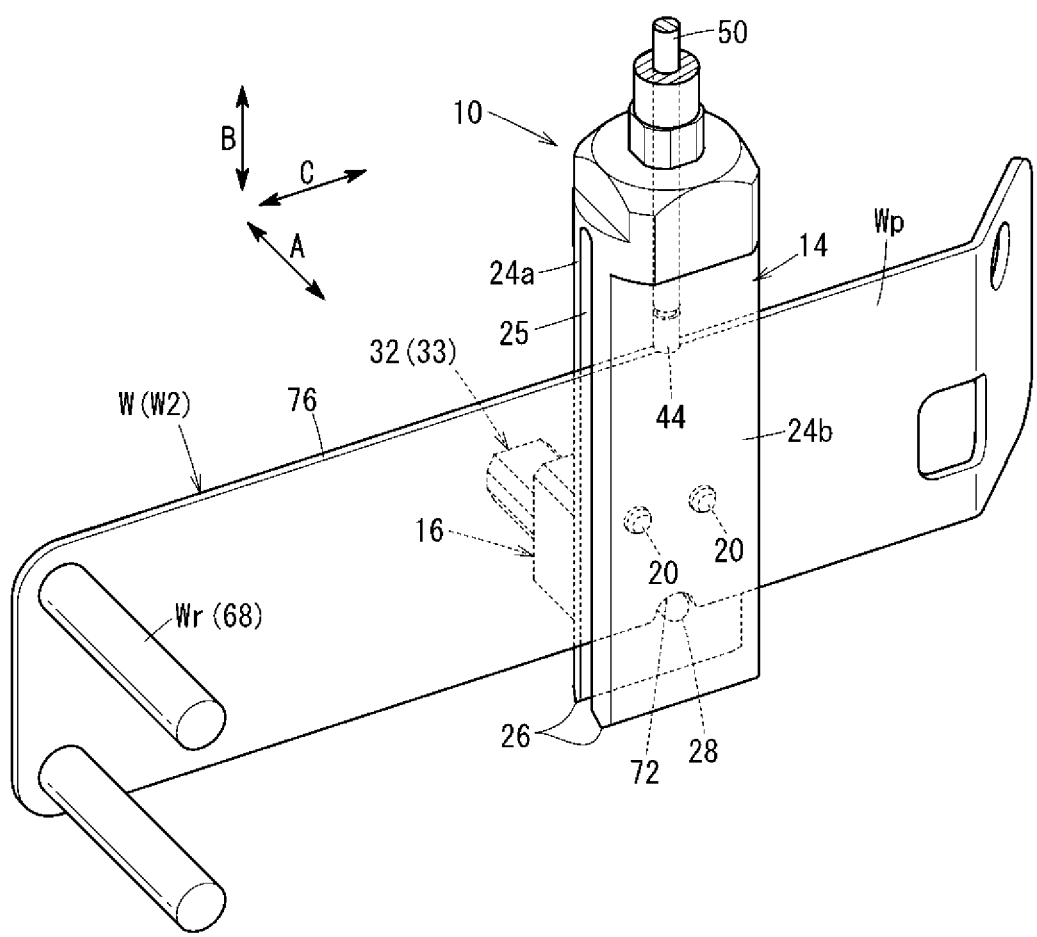
FIG. 8 is a perspective view for describing a case in which the workpiece gripping device grips the workpiece illustrated in FIG. 5B.

When gripping the workpiece W2, as illustrated in FIG. 8, the workpiece gripping device 10 can grip and transport the workpiece W2 by using the notch 72 of the workpiece W2. In this case, the operation of the workpiece gripping device 10 is ap-proximately similar to that of the gripping of the workpiece W1, except that the positioning pin 30 is inserted into the notch 72 instead of inserting the positioning pin 30 into the through hole 70.

When gripping the workpiece W3, as illustrated in FIG. 9, the workpiece gripping device 10 can grip an end part 78 near the bending part 74 with the V shape of the workpiece W3, for example. In this case, the engagement part 28 of the positioning pin 30 is pressed to the workpiece W3 and the contact part 44 of the stabilizer 18 is pressed to the edge part 76 of the workpiece W3. Thus, the workpiece W3 can be gripped appropriately. Note that if possible, the engagement part 28 of the positioning mechanism 16 is engaged with a concave part side (valley side) of the bending part 74.

In this case, the workpiece gripping device 10 according to the present embodiment has advantageous effects as follows.

As illustrated in FIG. 1 and FIG. 2, the workpiece gripping device 10 includes: the gripping body part 14 including the slit 25 into which the plate-shaped part Wp of the workpiece W is configured to be inserted; and the positioning mechanism 16 including the engagement part 28 configured to be engaged with the plate-shaped part Wp of the workpiece W in the slit 25 of the gripping body part 14 in order to position the workpiece W. Thus, the gripping body part 14 is moved so that the plate-shaped part Wp of the workpiece W is inserted into the slit 25 of the gripping body part 14 and the positioning mechanism 16 positions the workpiece W inserted into the slit 25. Therefore, the workpieces W (workpieces W1, W2, W3) with various shapes including the plate-shaped part Wp can be gripped appropriately. Accordingly, the robot 12 to which the workpiece gripping device 10 is attached can transport the workpieces W with various shapes automatically.

The gripping body part 14 includes the base part 22 and the two arm parts 24a, 24b that extend from the base part 22 and face each other, and the gripping body part 14 has the elongate-bar shape as a whole. Then, the slit 25 is formed between the two arm parts 24a, 24b. Thus, the gripping body part 14 can be reduced in size.

The tip end of at least one of the two arm parts 24a, 24b has the wedge shape. When the workpieces W are placed while overlapping each other, the above structure can insert the arm part 24a (or arm part 24b) with the wedge-shaped tip end into a space between the overlapping workpieces W, so that one of the overlapping workpieces W can be gripped easily.

As illustrated in FIG. 2, the positioning mechanism 16 includes the positioning pin 30 configured to move in the thickness direction of the slit 25, and the positioning actuator 32 configured to drive the positioning pin 30. By this structure, the positioning pin 30 is engaged with a particular shape part (for example, the through hole 70, the notch 72, or the bending part 74) provided to the workpiece W, so that the workpiece W can be positioned more appropriately.

The positioning actuator 32 includes the output part 34 configured to operate in the thickness direction of the slit 25. Then, the positioning pin 30 is inserted into the pin insertion hole 29 provided in the gripping body part 14, and is fixed to the tip end part of the output part 34. Thus, the positioning mechanism 16 with the appropriate positioning capability can be achieved by the simple structure.

The workpiece gripping device 10 further includes the stabilizer 18 configured to suppress the movement of the workpiece W inserted into the slit 25. The stabilizer 18 includes the contact part 44 configured to contact the edge part 76 of the workpiece W, and the actuator 46 configured to move the contact part 44. This structure can prevent the workpiece W gripped by the workpiece gripping device 10 from wobbling (prevent the workpiece W from swinging around the engagement part 28).

The contact part 44 is arranged in the slit 25. Thus, since the contact part 44 is brought into contact with the workpiece W in the slit 25, the wobble of the workpiece W can be suppressed with a small structure.

The contact part 44 is arranged on the inner side of the slit 25 relative to the positioning pin 30. Since this structure holds the workpiece W between the positioning pin 30 and the contact part 44, the workpiece W can be gripped more stably.

The workpiece gripping device 10 further includes the pressing member 20 projecting into the slit 25. In the workpiece gripping device 10, the pressing member 20 is configured to press the workpiece W inserted into the slit 25, in the thickness direction of the workpiece W. This structure improves the stability in gripping the workpiece W.

The pressing member 20 is arranged on the inner side of the slit 25 relative to the engagement part 28 of the positioning mechanism 16. This structure further improves the stability in gripping the workpiece W.

As illustrated FIG. 3, the pressing member 20 is the ball plunger 66 that includes the ball 60 and the spring 62 configured to elastically energize the ball 60. This structure reduces the insertion resistance when the workpiece W is inserted into the slit 25 of the gripping body part 14; thus, the workpiece W can be gripped smoothly.

The pressing member 20 is inserted into the hole part 56 provided in the gripping body part 14. By this structure, the pressing member 20 can be easily arranged with respect to the gripping body part 14.

As illustrated FIG. 4, the two pressing members 20 are arranged to be separated from each other so that the contact part 44 is configured to be inserted therebetween. By this structure, the contact part 44 can be moved to the tip end side of the slit 25 over the pressing member 20 without interference between the contact part 44 and the pressing member 20.

Note that the above embodiment has described the structure including the positioning pin 30 and the positioning actuator 32 as the positioning mechanism 16. However, the structure of the positioning mechanism 16 is not limited to this example. In a modi-fication of the positioning mechanism 16, for example, a projection may be provided on an inner surface of the gripping body part 14 on the slit 25 side. In this case, the projection functions as the engagement part 28 that engages with the workpiece W.

Only a single pressing member 20 may be provided. The pressing member 20 may be omitted depending on a specification necessary for the workpiece gripping device 10.

The present invention is not limited to the embodiment described above, and various modifications can be employed without departing from the gist of the present invention.

The invention claimed is:

1. A workpiece gripping device attached to a robot and used for gripping a workpiece, the workpiece including a plate-shaped part in at least a part thereof, the device comprising:
   a gripping body part including a slit into which the plate-shaped part of the workpiece is configured to be inserted; and
   a positioning mechanism including an engagement part configured to be engaged with the plate-shaped part of the workpiece in the slit of the gripping body part, in order to position the workpiece,
   wherein the positioning mechanism includes a positioning pin configured to move in a thickness direction of the slit, and a positioning actuator configured to drive the positioning pin.

2. The workpiece gripping device according to claim 1, wherein:
   the positioning actuator includes an output part configured to operate in the thickness direction of the slit; and
   the positioning pin is inserted into a pin insertion hole provided in the gripping body part, and is fixed to a tip end part of the output part.

3. The workpiece gripping device according to claim 1, further comprising a stabilizer configured to suppress a movement of the workpiece inserted into the slit,
   wherein the stabilizer includes a contact part configured to contact an edge part of the workpiece, and an actuator configured to move the contact part.

4. The workpiece gripping device according to claim 3, wherein the contact part is arranged in the slit.

5. The workpiece gripping device according to claim 3, wherein:
   the positioning mechanism includes a positioning pin configured to move in a thickness direction of the slit; and
   the contact part is arranged on an inner side of the slit relative to the positioning pin.

6. The workpiece gripping device according to claim 1, wherein:
   the gripping body part includes a base part and two arm parts that extend from the base part and face each other, and the gripping body part has an elongate-bar shape as a whole; and
   the slit is formed between the two arm parts.

7. The workpiece gripping device according to claim 6, wherein a tip end of at least one of the two arm parts has a wedge shape.

8. A workpiece gripping device attached to a robot and used for gripping a workpiece, the workpiece including a plate-shaped part in at least a part thereof, the device comprising:
   a gripping body part including a slit into which the plate-shaped part of the workpiece is configured to be inserted;
   a positioning mechanism including an engagement part configured to be engaged with the plate-shaped part of the workpiece in the slit of the gripping body part, in order to position the workpiece; and
   a pressing member projecting into the slit,
   wherein the gripping body part includes first and second arm parts that face each other, the slit being formed between the first arm part and the second arm part;
   the pressing member projects from the first arm part toward the second arm part in the slit, and
   wherein the pressing member is configured to press the workpiece inserted into the slit, in a thickness direction of the workpiece to clip the workpiece between the pressing member and the second arm part.

9. The workpiece gripping device according to claim 8, wherein the pressing member is arranged on an inner side of the slit relative to the engagement part of the positioning mechanism.

10. The workpiece gripping device according to claim 8, wherein the pressing member is a ball plunger that includes a ball and a spring configured to elastically energize the ball.

11. The workpiece gripping device according to claim 8, wherein the pressing member is inserted into a hole part provided in the gripping body part.

12. The workpiece gripping device according to claim 8, further comprising a stabilizer configured to suppress a movement of the workpiece inserted into the slit, wherein:
   the stabilizer includes a contact part configured to contact an edge part of the workpiece, and an actuator configured to move the contact part; and
   the pressing member comprises at least two pressing members and the two pressing members are arranged to be separated from each other so that the contact part is configured to be inserted therebetween.

* * * * *